United States Patent [19]
Breed

[11] Patent Number: 5,389,751
[45] Date of Patent: Feb. 14, 1995

[54] LONG DWELL CRASH SENSOR

[75] Inventor: David S. Breed, Boonton, N.J.

[73] Assignee: Automotive Technologies International, Inc., Denville, N.J.

[21] Appl. No.: 24,218

[22] Filed: Mar. 1, 1993

Related U.S. Application Data

[63] Continuation-in-part of Ser. No. 686,717, Apr. 17, 1991, abandoned, and Ser. No. 727,757, Jul. 9, 1991, Pat. No. 5,233,141.

[51] Int. Cl.⁶ ............... H01H 35/14; B60R 21/32
[52] U.S. Cl. .................... 200/61.45 R; 200/61.48; 200/61.51; 280/735
[58] Field of Search .............. 200/61.45 R–61.53, 200/61.45 M; 280/728–735

[56] References Cited

U.S. PATENT DOCUMENTS

| | | | |
|---|---|---|---|
| 3,720,426 | 3/1973 | Johnston | 200/61.45 R |
| 3,795,780 | 3/1974 | Lawrie | 200/61.45 R |
| 3,950,719 | 4/1976 | Maxwell | 335/205 |
| 4,103,842 | 8/1978 | Martin et al. | 200/61.52 X |
| 4,369,344 | 1/1983 | Diamond | 200/61.43 |
| 4,900,880 | 2/1990 | Breed | 200/61.45 M |
| 5,153,393 | 10/1992 | Breed et al. | 200/61.45 R |
| 5,155,307 | 10/1992 | Breed et al. | 200/61.45 R |
| 5,192,838 | 3/1993 | Breed et al. | 200/61.45 R |
| 5,198,740 | 3/1993 | Jacobsen et al. | 200/61.53 |
| 5,231,253 | 7/1993 | Breed et al. | 200/61.45 R |
| 5,233,141 | 8/1993 | Breed | 200/61.45 R |

OTHER PUBLICATIONS

"A Complete Frontal Crash Sensor System-1", David Breed et al., SAE International Congress and Exposition, Mar. 1–5, 1993, (SAE Technical Paper Series 930650).

Primary Examiner—J. R. Scott
Attorney, Agent, or Firm—Samuel Shipkovitz

[57] ABSTRACT

A vehicle crash detecting sensor having a pivoted sensing mass which rotates, in response to vehicle deceleration occurring in a crash of a vehicle, from an at-rest position through a second position of rotation at which time airbag deployment is enabled and then the mass is intentionally rotated through to a third (long dwell) position at a rotational angle much larger in magnitude and in the same direction as that of the second position. The sensing mass is spring biased to always bias the mass during rotation to the at-rest position regardless of the dwell angle of the mass during rotation. By appropriate configuration of the inner wall of the housing to which the other end of the spring, typically an elastica spring, is attached, the part of the spring which touches the wall can be controlled and thereby ensuring that the direction of the torque is always the same,- that is, towards the at-rest position.

10 Claims, 8 Drawing Sheets

LONG DWELL CRASH SENSOR

This invention is a continuation-in-part of U.S. patent application Nos. 07/686,717, filed Apr. 17, 1991, and 07/727,757, filed Jul. 9, 1991, now U.S. Pat. No. 5,233,141.

BACKGROUND OF THE INVENTION

In Society of Automotive Engineers (SAE) paper 930650, "A Complete Frontal Crash Sensor System - I", by Breed, Sanders, and Castelli, which is included herein by reference, the authors conclude that an airbag crash sensor system should include an electro-mechanical arming sensor having a long dwell. Many vehicle airbag sensor systems use a sensor mounted forward in the crush zone of the vehicle. However, there are crashes where the crush zone sensor can close, indicating that a crash is in progress which requires the deployment of the airbag, when the arming sensor, which is normally mounted back in the passenger compartment, has closed but reopened due to the dynamics of the crash. This is known as insufficient dwell and is characteristic of most arming sensor designs.

Insufficient dwell can have several causes depending on the particular sensor design. In one case it can result when the sensing mass does not have sufficient overtravel, that is additional travel after the contacts are closed. In one case, for example, a one mile per hour velocity change is required to close the sensor and an additional two miles per hour is all that is required for the sensing mass of the sensor to reach its maximum travel. If during the crash there is a reversal in the crash pulse and the passenger compartment, where the arming sensor is typically mounted, speeds up by more than 2 miles per hour, the arming sensor will open and may stay open for an extended period of time. An example of this situation would a multiple accident on a foggy highway. If car number 2, for example, strikes the rear of car number 1 and the front of car number 2 experiences a 8 MPH velocity change when car number 2 is in turn struck in the rear by car number 3, the front of car number 2 will continue to slow down, perhaps by an additional 8 MPH causing the crush zone sensor to trigger, while the passenger compartment may be increasing its velocity causing the arming sensor to open. By the time that the arming sensor closes again, the crush zone sensor may have become disconnected and the airbag will not deploy.

Insufficient dwell can also be caused by the effects of cross-axis vibrations. These vibrations are those which occur in the vertical and lateral directions. Arming sensors are designed to sense longitudinal crash pulses. Sensors with sliding sensing masses have been shown to be strongly affected in both the time to trigger and the dwell when strong cross-axis vibrations are present at a level which occur in many types of crashes. Sensors based on a ball in a tube geometry have also been shown to be sensitive to cross axis vibrations which can also increase the time to fire and decrease the dwell.

In vehicles having both driver and passenger airbags, it is sometimes required to stage the deployment of the two airbags so as to reduce the noise and the pressure in the vehicle which would otherwise occur if both airbags deployed simultaneously. In these cases, the passenger airbag is sometimes delayed as much as 20 to 30 milliseconds from the time that the driver airbag deployment is initiated. This delay increases the possibility that the arming sensor will open either due to a reversal in the velocity or to the normal return of the sensing mass at the end of the crash signal. This latter occurrence is most likely either in marginal crashes or in short duration crashes. Most arming sensors have an increasing bias with sensing mass travel. The bias is the force on the sensing mass which returns it to its initial position where the contacts open at the end of the crash. Many arming sensors are biased with a spring and the force on the mass increases as the mass moves away from its initial position compressing the spring. When the crash pulse is over, therefore, the mass can be rapidly propelled back to its initial position.

Although most arming sensors have a relatively short dwell, one exception is a sensor based on a band and roller design. This sensor has a long dwell but is large and relatively expensive.

Another example of the prior art is a sensor which uses a sliding magnet as a sensing mass where the magnet passes close to a reed switch causing the reed switch contacts to attract each other and close after a particular displacement. The main advantage of this sensor is that it is small and inexpensive and, in one configuration using a dual sensing mass, a moderate dwell is achieved. One problem, however, is that this sensor has a single set of contacts with a limited current carrying capacity. If the current associated with an airbag deployment passes through the reed contacts they weld closed. Another problem is that it is very sensitive to cross-axis vibrations which can prevent the sensor from triggering or cause it to trigger late with reduced dwell on some airbag required crashes.

Dual sets of contacts in the arming sensor are desired by some system designers in order to isolate the reserve energy supply for the passenger airbag from the one for the driver airbag. In some cases, the first airbag which triggers can become shorted for a period sufficient to drain the energy from the reserve supply and prevent the second airbag from deploying. For this reason, dual energy reserves are sometimes used which then requires dual sets of contacts in the arming sensor.

It is also desirable for the contacts to open after the airbag has deployed. Unlike the crush zone sensor which usually exhibits significant visual damage after a crash, the arming sensor is mounted in the passenger compartment where its visual appearance is unaltered after the crash. A principle of good sensor design is that if the sensor is not visibly damaged, it must be functional. Since the contacts can weld closed on certain reed switch sensors, the sensor may appear good from the outside but have welded contacts inside. In this case the sensor might be inadvertently reused in a vehicle which is repaired after a crash where the airbags deployed. There is an especially strong motivation to reuse the airbag when it is part of an expensive electronic sensor and diagnostic package.

The invention disclosed and illustrated below is intended to solve the problems and limitations of the prior art discussed above.

SUMMARY OF THE INVENTION

The arming sensor of this invention is adapted for installation in the non-crush zone of an automobile equipped with a passenger protective device such as an inflatable airbag or seat belt tensioner. (Hereinafter the word airbag will be used for the purposes of this disclosure to mean all such passive passenger protective devices which are deployed or activated during a crash.)

The following are the principle objects and advantages of this invention:

1) To provide an arming sensor which once it triggers in an airbag desired crash, stays closed for a long dwell.

2) To provide an arming sensor with a two sets of contacts permitting separate circuits for deploying the driver and passenger side airbags.

3) To provide an arming sensor which is insensitive to cross-axis vibrations that occur during a vehicle crash.

4) To provide an arming sensor which is hermetically sealed in plastic, without requiring glass-to-metal seals.

5) To provide an arming sensor which is small In size and inexpensive to produce.

6) To provide an arming sensor which has a high current carrying capacity, where the contacts will not weld closed under the currents needed to deploy an airbag, permitting it to be reused after the airbag has deployed.

7) To provide an arming sensor which will remain closed even in the presence of velocity reversals in the passenger compartment during the crash.

Other objects and advantages of the present invention will become apparent from the following description of the preferred embodiments taken in conjunction with the accompanying drawings.

DESCRIPTION OF THE PREFERRED EMBODIMENTS

Figure 1:
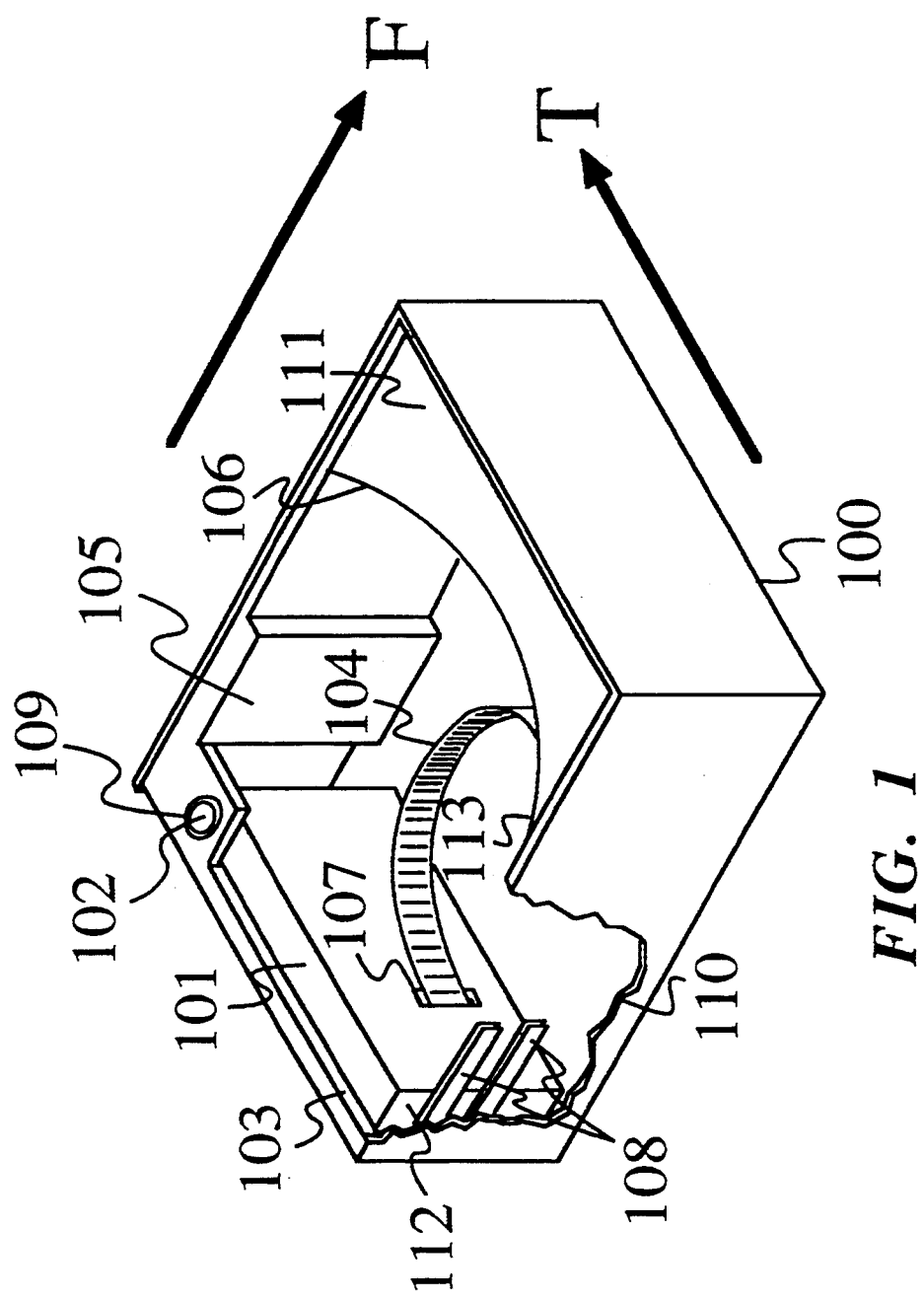
FIG. 1 is a perspective view with the cover removed and certain portions of a wall cut away, of a preferred embodiment of the arming sensor of this invention showing an elastica spring bias and a sensing mass having a large rotation angle, with the sensing mass at the at-rest position.

A perspective view with the cover removed, of a preferred embodiment of the arming sensor of this invention is illustrated at 100 in FIG. 1. During a crash sensing mass 101 rotates about .pivot 102, which is held in a hole 109, due to the deceleration of the vehicle. The sensor 100 is mounted, typically in the passenger compartment, so that arrow F is toward the front of the vehicle and the arrow T is toward the top of the vehicle. The sensing mass therefore swings in a vertical plane about pivot 102. The motion of the sensing mass is resisted by elastica spring 104 which is attached to the sensing mass by means of a pivot rod 107. Elastica spring 104 is also attached to curved surface 106 of sensor housing 111 at a point 113 which is hidden from view in this figure. The cover of the sensor and a portion of wall 110 have been removed to permit better viewing of key parts of the sensor. Like numerals, except for first (hundreds) digit have like meaning as to part numbers in the various Figures.

When the sensor experiences a crash of sufficient severity, the sensing mass 101 continues rotating until it engages block 105 at which time the mass has rotated a total of more than 100 degrees. Dual sets of contacts 108 are provided and rest against the top 112 of the sensing mass until the sensing mass has rotated approximately 20 degrees in this implementation. At this point the normally open contacts close indicating that a crash is in progress.

The torque produced by the elastica spring 104 (a prebuckled column made by stressing both ends of flat rectangular spring steel or the like, as generally known in the art, as discussed, for example in U.S. Pat. No. 5,153,393 to Breed et al., at col. 10 top) gravity, and the geometry of the sensor housing, begins at a maximum when the sensing mass is against housing wall 103 and becomes less until the contacts close. The torque is then approximately constant for the remainder of the rotation of the sensing mass 101.

This particular geometry has certain advantages heretofore not seen in arming sensors. The large rotational angle provides for a very long over travel of the sensing mass after the contacts have closed. The pivoted sensing mass provides immunity from cross-axis vibrations in the manner described in the co-pending patents cross-referenced above. After the contacts have closed, accelerations in the vertical direction have a greater and greater effect of the motion of the sensing mass but these accelerations usually average out to zero since vehicles rarely experience large vertical displacements during a crash. Thus, vertical accelerations cause the sensing mass to oscillate somewhat but rarely cause it to open. Those cases where there are large vertical accelerations in the passenger compartment which result in a significant vertical velocity change, usually occur long after the sensors have made the decision to deploy the airbags.

As discussed above, however, vehicle passenger compartments can experience significant longitudinal accelerations causing the passenger compartment to momentarily speed up even though the front of the vehicle is slowing down. In this case, the sensor illustrated in FIG. 1, once it has triggered, and the sensing mass in nearly at its maximum travel, it becomes very insensitive to longitudinal accelerations and thus the sensor remains closed even if the passenger compartment velocity increases. The dwell of the sensor is largely determined by the natural period of oscillation of the sensing mass and elastica spring combination. Once the sensor has triggered the torque falls to a value which is just sufficient to reliably return the sensing mass to its initial position, therefore, the time to return the mass to the point where the contacts open, or the dwell, is maximized.

The sensor housing 111 is manufactured from a suitable injection molded plastic such as a 30% glass filled polyester. This material is dimensionally stable over the temperature range that is-required for sensors. The elastica spring 104 can be made from any suitable spring material such as beryllium copper or plated spring steel. The stopping block 105 is usually made part of the sensor housing. In this case, the sensing mass will rebound somewhat in vigorous crashes. Although this is usually not a problem, even longer dwell can result if the stopping block is made from an energy absorbing material such as an open cell urethane foam having very small cells.

The elastica spring 104 is typically manufactured straight and elastically deformed as shown when assembled into the sensor housing 111. When the sensing mass 101 rotates, the elastica spring 104 continues to deform receiving support only from its two ends. When the rotation of the sensing mass 101 is approximately 20 degrees in this implementation, the contacts close and a portion of the elastica spring 104 engages the curved surface 106 of housing 111. If this engagement did not take place, the torque on the sensing mass 101 would drop to zero and then go negative as the point of attachment on the sensing mass passes through a line joining the sensing mass pivot point 102 and the elastica spring attachment point on the housing and snaps through as in an over center system. In mechanical engineering, an over center system is one where as an element is moved, the force associated is in one direction until a certain point is reached, and then the force changes direction. A toggle switch or a simple snapping mechanism are examples. The engagement of the elastica spring with curved surface 106 prevents this over-center snap through from occurring since the effective attachment point of the elastica spring 104 is now approximately at the point where the elastica spring engages the curved surface 106. As the sensing mass rotates further, the engagement point also moves counterclockwise in the figure and in all cases stays in front of the line joining the sensing mass pivot 102 and the elastica spring attachment point to the sensing mass 112. In this manner the torque never becomes negative and can be arbitrarily chosen by varying the shape of surface 106 to give any torque versus rotation relationship desired. For the case described here, an approximately constant torque at a low value was chosen for rotations beyond the triggering location.

The shape of curved surface 106 of housing 111 is thus the primary determinate of the shape of the torque versus sensing mass rotation function. This shape can either be determined by trial and error or through the use of a computer program which simulates the motion of the sensing mass.

The invention herein uses the physics principle of an over center system except that the direction of action of the force follows a prescribed path such that the over center or snapback never quite happens and thus the force is always in the same direction. For example in FIG. 2, elastica spring 204 contacts surface 206 at progressive points so that there is always a clockwise torque acting on mass 201. If surface 206 was not there then when the end of the elastica spring 204 which contacts mass 201 became to the left of a line drawn between pivot 202 and the other end of elastica spring 204, the torque would be counterclockwise and mass 201 would rotate in the counterclockwise direction. As noted, by properly shaping surface 206, the torque remains clockwise, and thus able to obtain the relationship shown in FIG. 4.

Figure 2:
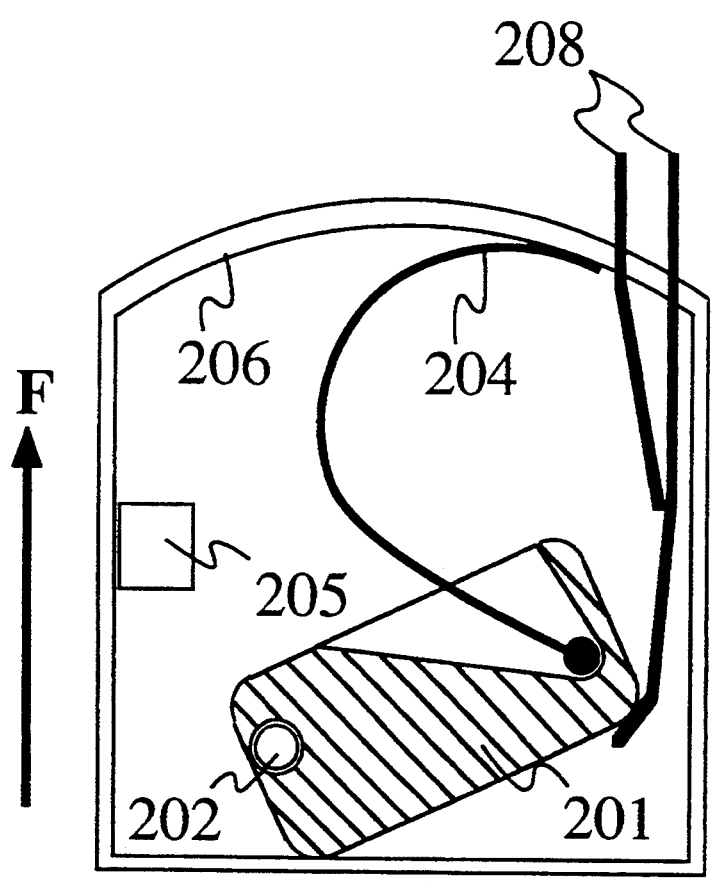
FIG. 2 is a plane side view of a somewhat different sensor from the sensor shown in FIG.1 with the sensing mass at the point of switch closure.
Figure 3:
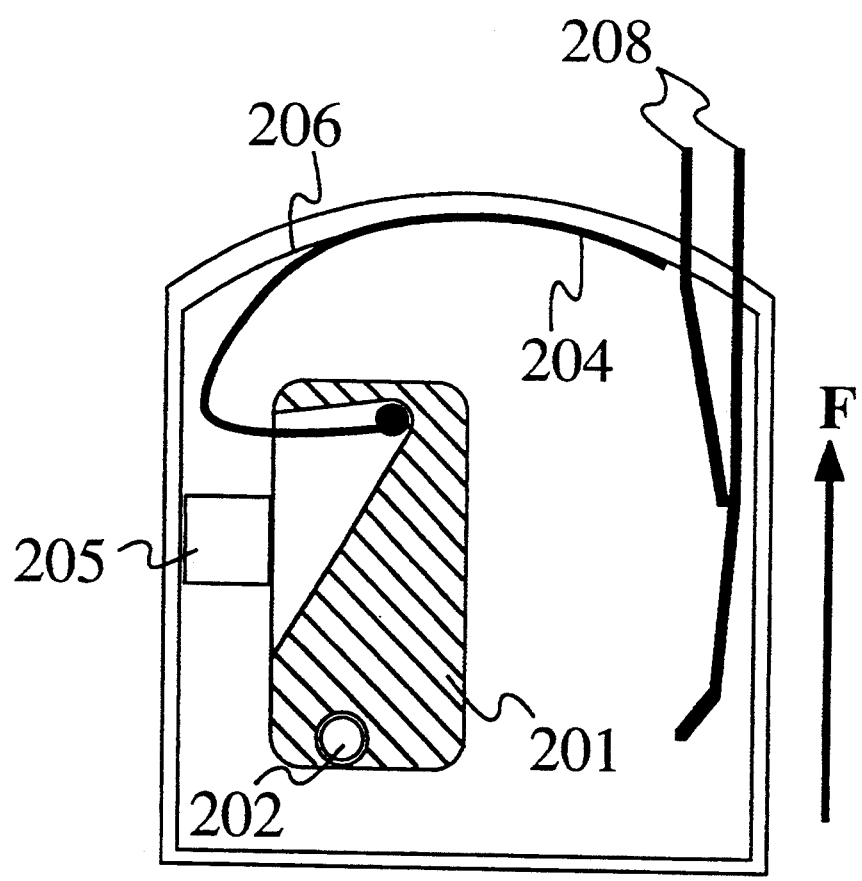
FIG. 3 is a view of the sensor of FIG. 2 shown with the sensing mass at the maximum travel position.

A slightly different implementation of the sensor of this invention is shown in a plan view in FIG. 2. As noted by comparing the figures and their parts, 201 is the sensing mass, 202, is the pivot, 204 is the elastica spring, 206 is the curved surface/inner wall of the sensor housing. In this illustration the sensor is shown with the sensing mass at the point of switch closure, which in this case is not the point of minimum torque. The sensing mass continues to rotate for approximately another 30 degrees before the torque levels out. The contacts 208 are attached to the forward part of the sensor instead of the rear as in FIG. 1. This permits the sensor to be mounted projecting back from a vertically mounted printed circuit board. Once again the sensing mass rotates until it engages stopping block 205 and arrow market F denotes the direction toward the front of the vehicle. In FIG. 3 the sensor of FIG. 2 is illustrated with the sensing mass at its maximum travel. This maximum travel in some implementations is about 60 degrees, in others about 75 degrees and in the preferred implementation shown here, about 100 degrees. In this figure the same parts have the reference numbers as in FIG. 2. In both of the preferred embodiments shown in FIGS. 1 and 2, the total travel is at least three times the travel to contact.

Figure 4:
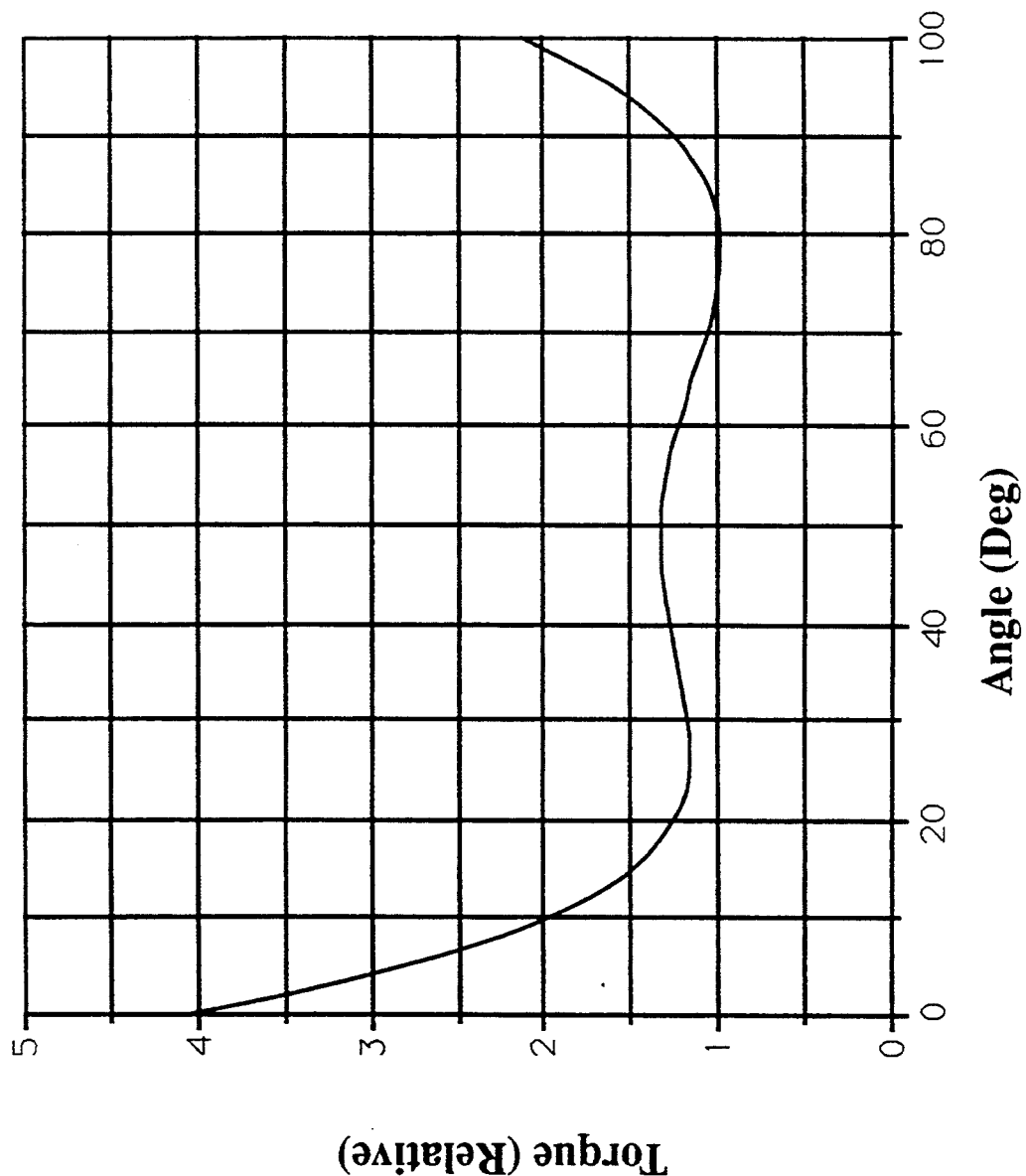
FIG. 4 is a representative plot of the torque exerted on the sensing mass of FIG. 1 by the biasing spring as a function of the rotation angle of the sensing mass.

In FIG. 4 a typical plot is shown of the torque exerted on the sensing mass by the elastica biasing spring as a function of the rotation angle of the sensing mass. An elastica spring as used here is a spring formed from a strip of metal and loaded at its ends so that it bows in the center much like the buckling of a column. There are of course other methods of achieving a decreasing and then approximately constant torque versus rotation function. The point at which the spring contacts the sensing mass could be varied in much the same way as the contact point on the housing wall 106 was changed in the examples above. Also, a carefully designed magnetic circuit or the properly designed geometry of the band in a band and roller sensor, are other examples of how to achieve the desired biasing function. In the preferred embodiments disclosed here the minimum biasing force on the sensing mass is at least $\frac{1}{2}$ of the maximum force.

A key feature of the arming sensor shown above is that substantial effective travel is obtained through the use of a large rotation angle. Another key feature is the fact that because of the large rotation angle, the sensor becomes insensitive to the effects of longitudinal accelerations which can prematurely cause the sensor to open. These features plus the low bias achieved all serve to lengthen the dwell and also permit the sensor to be miniaturized. This miniaturization, however, reduces the force available to make good electrical-contact. It is this low force which has led to the welding problem with reed contacts mentioned above. Low contact force results in a high contact resistance and to the heating and thus welding of the contacts. It has been found in the electronics industry that this problem can be greatly reduced through the plating of diamonds onto one of the contact surfaces. Diamonds are naturally nonconductive and so they are first coated with a thin film of metal through a sputtering process. A film of gold is then plated onto the diamonds and the diamonds are then plated onto the contact surface. The diamond material used is a fine powder and although the material is expensive it covers a large area so that the cost per square inch of contact area is small and will have a negligible affect on the cost of the sensor. By this process the contact resistance even at very light loads is reduced by a factor of approximately 8. In this manner, the contact force ceases to be the prime determining factor in the size of the sensing mass. Naturally, now that this concept has been disclosed for this sensor it will be obvious to those skilled in the art to apply it to other sensors and thus achieve substantial cost savings through the miniaturization of other sensor designs.

Figure 5:
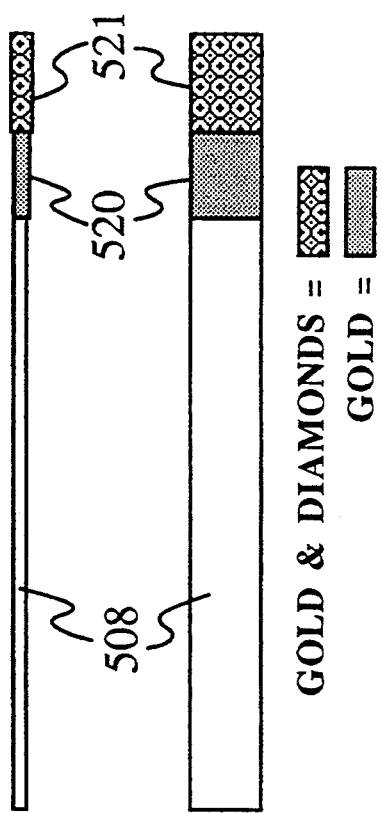
FIG. 5 is a plane view of one of the contacts used in the present sensor design showing the preferred plating of gold and diamonds.

FIG. 5 illustrates one of the contacts used in the present sensor design showing the preferred plating of gold and diamonds of a typical contact 508. Only the tip 521 where the electrical connection will be made is coated with diamonds. Gold 520 is usually plated over a slightly larger portion of the contact as shown. The diamonds function by cutting through any surface films that may have deposited on the contact surfaces exposing fresh metal to make the electrical contact. Tests in the electronics industry have shown that the diamonds do not have a permanent effect on the contact surfaces, and the contact life, as measured by number of make and break contacts to failure, is as good or better than conventional technologies. Also contact wiping which is usually required for good contact design, where one contact rubs on the other, is unnecessary when diamonds are used in the manner as disclosed here.

Figure 6:
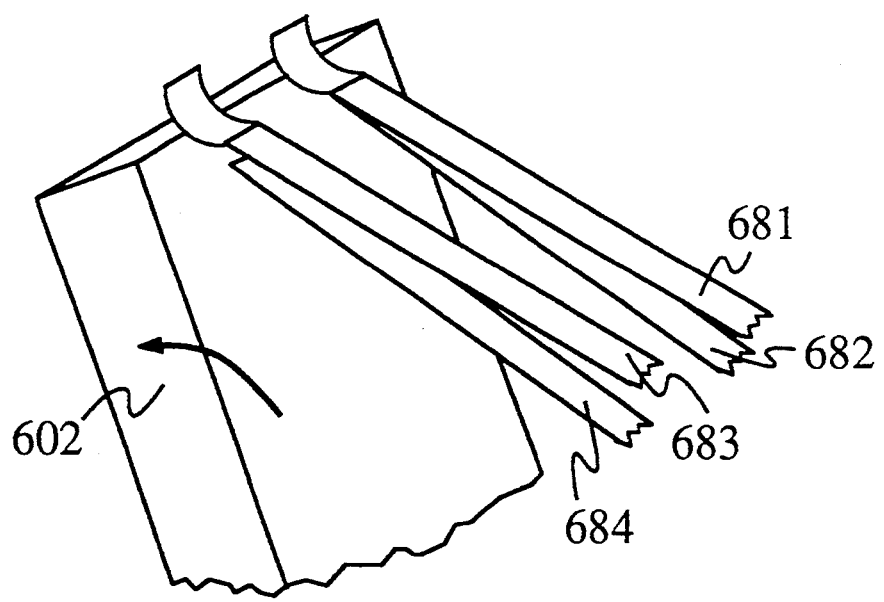
FIG. 6 is a detail of the sensing mass and dual sets of contacts, with portions cut away, showing the position of the sensing mass when the first set of contacts have closed but before the second set have closed.

In FIG. 6 a detail with portions cut away of the sensing mass and dual sets of contacts is illustrated showing the position of the counterclockwise-marking sensing mass when the first set of contacts 681 and 682 (about 1 o'clock position) have closed but before the second set 683 and 684 (about 2 o'clock position) have closed. The need for an insulating surface on a conductive sensing mass 602 is eliminated by staging the contact closures in this manner. If the sensor is configured so that the contacts 681 and 684 are connected to the driver and passenger airbag modules respectively, and contacts 682 and 683 to the reserve power supplies, then the momentary shorting of 681 and 683 to one of the reserve supplies is acceptable. This is because, the airbag system is designed so that the two airbag systems are staged and thus when the contacts engage only the driver side airbag will be in a condition to trigger. This also would be a problem if the discriminating sensor triggers before the arming sensor which rarely if ever happens. As long as the arming sensor triggers first then at no time will one of the power supplies be connected across two airbag systems which would also only happen in those systems where staging of the two systems was not done. In this manner, the sensing mass can be made from metal and need not be insulated from the contacts, thus simplifying the design and reducing the cost of the sensor.

Figure 7:
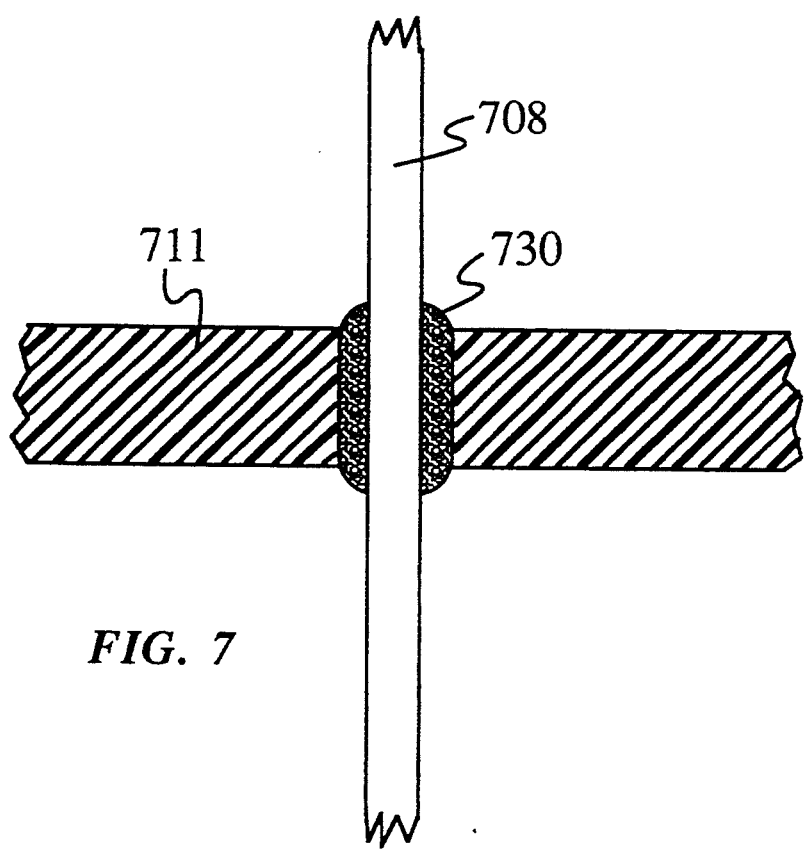
FIG. 7 is a cross section detail of one of the connector pin seals with portions cut away illustrating the assembly of the connector pin into a wall of the sensor.

Although the arming sensor is usually mounted within a protected enclosure which houses the electronic sensor and diagnostic circuitry, it is nevertheless highly desirable to seal the sensor from the environment. This is accomplished in the sensor disclosed here by heat sealing the sensor cover to the sensor body and by using a heat activated epoxy coating on the contacts where they pass through the sensor body. The heat activated epoxy is chosen from a class of B-stagable epoxies which are first diluted with a solvent and applied as a paint to the contact surfaces at the locations where they will be surrounded by plastic. After the epoxy paint dries, the contacts are inserted into a mold and hot melted plastic is injected using conventional insert molding techniques. The heat from the melted plastic melts the epoxy which then bonds to the metal contacts and also to the plastic forming an hermetic seal. The is shown in FIG. 7 where a single contact section 708 is shown sealed to a plastic housing 711 using B-stagable epoxy 730.

Figure 8:
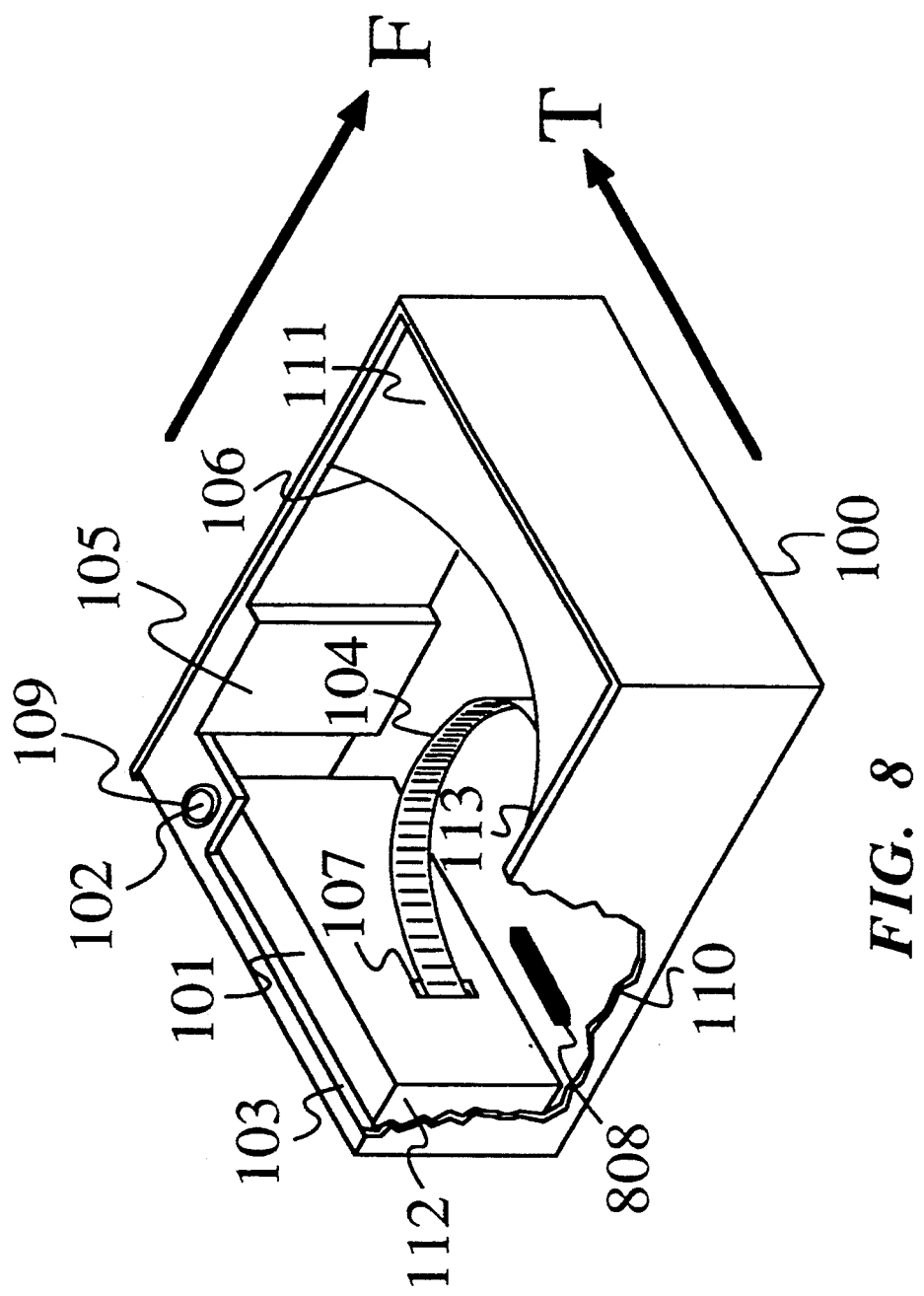
FIG. 8 is a perspective view as in FIG. 1 further showing the use of other devices which are sensitive to the sensing mass position for triggering the deployment of the airbag.

The examples illustrated above all make use of simple contact systems. Naturally other methods of switch closure could be used without departing from the teachings of this disclosure. The sensing mass could be made from magnetic material, for example, and a reed switch could be activated by the motion of the magnetic sensing mass. In a similar manner a Wiegand wire or an Hall effect sensor could be used to sense the motion of the sensing mass as shown generally as device 808 in FIG. 8.

Although an arming sensor is illustrated in the preferred embodiments disclosed here, the principles disclosed could also be used in a discriminating sensor design.

There has thus been shown and described an arming sensor having a long dwell which fulfills all the objects and advantages sought after. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

What is claimed is:

1. In a vehicle having a deployable airbag, vehicle crash detecting sensor comprising:
   a housing;
   a switch means within said housing and operatively connected to said airbag;
   a pivoted sensing mass within said housing, rotatably responsive to vehicle deceleration, having a first position where said mass is at rest in the absence of vehicle deceleration, a second position at a first rotation angle from said first position where said sensing mass is operatively adjacent said switch means, and a final position at a second rotation angle from said at-rest position, said second rotation angle having a magnitude of at least three times that of said first rotation angle;
   a spring biasing means within said housing exerting a torque on said sensing mass urging it toward said first position;
   and wherein said switch means enables deployment of said airbag in response to the motion of said sensing mass operating said switch means when in said second position.

2. The invention in accordance with claim 1 wherein said second rotation angle is at least 60 degrees.

3. The invention in accordance with claim 1 wherein said bias is created by an elastica spring.

4. The invention in accordance with claim 1 wherein said switch means comprises a Hall effect device.

5. The invention in accordance with claim 1 wherein said switch means comprises a reed switch.

6. The invention in accordance with claim 1 wherein said switch means comprises a Wiegand effect device.

7. In a vehicle having a deployable airbag, a vehicle crash detecting sensor comprising:
   a housing;
   a switch means within said housing and operatively connected to said airbag;
   a sensing mass within said housing, whose movement is responsive to the deceleration of said vehicle, having a first at-rest position where said mass is at rest in the absence of vehicle deceleration and a second position at a rotational displacement from said at-rest position where said sensing mass is operatively adjacent said switch means;

a biasing means within said housing exerting a force on said sensing mass urging it toward said first at-rest position;

said switch means enabling deployment of said airbag in response to the motion of said sensing mass to said second position, said sensing mass operating said switch means when said mass is at said second position;

said switch means comprising electrical contact means; and wherein said contact means comprises a conductive coating comprising diamonds.

8. In a vehicle having a deployable airbag, a vehicle crash detecting sensor comprising:

a housing;

switch means within said housing and operatively connected to said airbag;

a pivoted sensing mass within said housing, rotatively responsive to vehicle deceleration, having a first at-rest position where said mass is at rest in the absence of vehicle deceleration, a second position at a first rotation angle from said first at-rest position and where said sensing mass is operatively adjacent said switch means, and a final position at a second rotation angle from said first at-rest position;

a biasing means within said housing exerting a torque on said sensing mass urging said mass toward said first at-rest position, said biasing means exerting a torque on said sensing mass at said final position, said torque having a magnitude less than one-half of the torque exerted by said biasing means on said sensing mass when said mass is at said at-rest position; and wherein said switch means enabling deployment of said airbag in response to the motion of said sensing mass to said second position; said sensing mass operating said switch means when said mass is at said second position.

9. A vehicle crash detecting sensor comprising: a housing;

an electrically conductive sensing mass within said housing, whose movement is responsive to the deceleration of said vehicle, having an at-rest position, a first triggering position and a second triggering position, said second triggering position located rotationally beyond said first triggering position;

said first triggering position located rotationally beyond said at-rest position;

a biasing means exerting a force on said sensing mass urging it toward said at-rest position;

a first pair of contacts having a first contact and a second contact, said first contact of said first pair(i) biased toward but held apart from said second contact of said first pair of contacts by said sensing mass when said sensing mass moves from said at-rest position to said first triggering position, and, (ii) released from said sensing mass thereby enabling engagement with the second contact of said first pair of contacts when said sensing mass moves beyond said first triggering position, thereby enabling the deployment of a first airbag; and a second pair of contacts having a first contact and a second contact, said first contact of said second pair (i) biased toward but held apart from said second contact of said second pair of contacts by said sensing mass when said sensing mass moves from said at-rest position to said second triggering position, and, (ii) released from said sensing mass thereby enabling engagement with the second contact of said second pair of contacts when said sensing mass moves beyond said second triggering position, thereby enabling the deployment of a second airbag.

10. A method for producing an hermetically sealed deceleration sensor having a plastic housing and at least one metal conductor member with at least two ends with one end within said housing and one other end outside of said housing, said housing having at least one wall, said method comprising the steps of:

(a) coating said metallic conductor on the portion of said conductor which will pass through a wall of said housing with a heat activatable plastic coating; and, (b) insert-molding said metallic member into said wall of said housing at an elevated temperature, said elevated temperature activating said heat activatable plastic coating, bonding said metallic conductor to said housing.

* * * * *